US006823260B1

(12) United States Patent
Turcotte

(10) Patent No.: US 6,823,260 B1
(45) Date of Patent: Nov. 23, 2004

(54) METHOD AND APPARATUS FOR DEVICE AND CARRIER INDEPENDENT LOCATION SYSTEMS FOR MOBILE DEVICES

(75) Inventor: Michel Turcotte, San Jose, CA (US)

(73) Assignee: Palm Source, Inc., Sunnyvale, CA (US)

( * ) Notice: Subject to any disclaimer, the term of this patent is extended or adjusted under 35 U.S.C. 154(b) by 742 days.

(21) Appl. No.: 09/802,172

(22) Filed: Mar. 7, 2001

(51) Int. Cl.$^7$ ............................................. G01C 12/26
(52) U.S. Cl. ..................... 701/213; 701/300; 701/207; 709/217; 709/318
(58) Field of Search ............................... 701/213, 207, 701/209, 212, 216, 300; 707/3, 6, 10, 104.1; 709/203, 217, 218, 318

(56) References Cited

U.S. PATENT DOCUMENTS 6,446,004 B1 * 9/2002 Cao et al. .................... 701/213

* cited by examiner

Primary Examiner—B. James Peikari
(74) Attorney, Agent, or Firm—Wagner, Murabito & Hao LLP

(57) ABSTRACT

A method and system for a device and carrier independent geographic location protocol. Specifically, the present invention provides location information of a mobile device to third parties in a communication network through a protocol that is device and network carrier independent. Position information of any first format is sent to a proxy server. An identifier that identifies the type and format of the position information is also sent. The proxy server then locates and accesses an executable plug-in module associated with the identifier to convert the position information of the first format into one of a plurality of standard location formats. The executable plug-in module converts the position information into a second standard format as required by the third party. After the position information is converted to the second format, the proxy server sends the position information to the third party.

32 Claims, 12 Drawing Sheets

51

| IDENTIFIER 710 | LENGTH 720 | RAW INFORMATION 730 |

| | |
|---|---|
| Zip code and Postal code | PostalCode 912 |
| City name | CityName |
| Country code (appendix D) | CountryCode |
| Country name | CountryName |
| State name (large political division) | LargeAreaName |
| State code (large political division) | LargeAreaCode |
| County name (small political division) | SmallAreaName |
| County code (small political division) | SmallAreaCode |
| Raw Location data (hexadecimal) | not Applicable |
| | |
| | |
| Closest Major Airport code | AirportCode |
| GPS coordinates | GPS 914 |
| Phone area code | PhoneAreaCode |
| | |
| | |
| Train station code (code or name?) | TrainStationCode |
| Train station name (code or name?) | TrainStationName |
| Time zone | TimeZone |
| Daylight Saving Time | DaylightTime |
| Mobile Network ID | MobilNetworkID |
| Mobile Network Name | MobilNetworkName |
| Mobile Network CellularID | MobilNetworkCellID |
| IP address | IPAddrs |
| | |
| | |
| Local time | LocalTime |
| Street name | StreetName |
| Street address (number on the street) | StreetAddress |
| User typed data | not applicable |
| User ID | UserID |

FIGURE 9

METHOD AND APPARATUS FOR DEVICE AND CARRIER INDEPENDENT LOCATION SYSTEMS FOR MOBILE DEVICES

BACKGROUND OF THE INVENTION

1. Field of the Invention

The present invention relates to the field of location systems and protocols for mobile devices.

2. Related Art

Communication networks exist that allow for electronic mobile devices to communicate with and retrieve information from a variety of content providers in the network. The mobile device can be located anywhere in the world.

For particular types of information, it is necessary to provide location information in order to process a request from the mobile device. For example, a user may require weather information from a content provider located on the Internet. In order for the content provider to process a request for weather information, the content provider must know where the user is geographically located in the world.

Heretofore, methods that provide location information of a user, through their mobile device, are network carrier, connection hardware, and connection software dependent in that a particular type of hardware can only interface with a particular network carrier in order to provide location information of a specific format. In other words, the entire system is designed for a one-to-one relationship between the hardware device and the network carrier when providing location information to a third party, such as a content provider.

Further, it is preferable that the location information be of a specific format in order for the content provider to understand the information and process a request for information. In some cases, the method may also be dependent on a proxy server to convert location information of the specific format to a published standard format. In that case, the proxy server is able to interpret and understand the information of the specific format.

For example, an Internet capable mobile handheld device can submit a request for weather information to a content provider over a communication network through a proxy server. The proxy server acts to convert the transfer of information between the mobile device and the content provider. In fact, the proxy server ensures that location information coming from the mobile device is converted to a particular format as requested by the content provider. The request for location information of a specific format from the content provider may be embedded in the web clipping application specific to the content provider. The format required by the content provider may be a mailing zip code as used in the United States of America.

Understanding that the content provider requires location information, the connection software driver that connects the mobile device to a network communicates with a particular network carrier for specific location information. The communicated location information can be of any particular type, as long as the connection software driver, the network carrier, and the proxy server understand the format and type of information.

In particular, one type of information can be tower information. When communicating with the network, the connection software driver in the mobile device may have access to information about the tower or base station that the mobile device connects through to access the communication network. Specifically, a particular type of information is the tower ID or identification number.

The connection software driver in the mobile device sends the tower ID information to the proxy server. The proxy server then can convert the tower ID information to a zip code that corresponds to the location of the accessed tower. This conversion can be facilitated with the use of a mapping table that ties specific towers to specific zip codes.

After the proxy server converts the location information, the complete request for weather information, including the converted location information, is sent to the content provider for weather information. The content provider, with the proper location information in the proper zip code format, then sends a web page back to the proxy server with the weather information to be sent to the mobile device.

A problem exists in that the process for transferring the location information is device and network carrier specific. If the mobile device were to connect to the Internet using a different network carrier and different connection software driver, then location information of any type would not be generated. The connection software driver would not be able to or understand how to receive tower information from the different network carrier in order to process a request for location information. Thus, the method requires that the mobile device use a particular network carrier.

Thus, the mobile device must connect to the network using specific connecting hardware, a specific connecting software driver, and a specific network carrier. Each of these dependent components understand that location information of a specific format is required, e.g., that of tower ID. If, however, the mobile device uses a different connecting hardware, such as a wireless internal modem instead of a built-in radio, the software driver associated with the modem will not know or understand that location information is requested. As such, the software driver associated with the modem will not be able to send the necessary tower ID information to the proxy server.

SUMMARY OF THE INVENTION

Embodiments of the present invention disclose a method and system for providing geographic location information for a mobile device to a third party through a communication network. The present invention provides a more flexible mechanism and protocol for providing location information. In addition, the present invention provides a better interface over a communication network between a mobile device and a third party for providing location information. Also, the present invention provides for a more universal system that is device and carrier independent for providing location information over a communication network.

Specifically, embodiments of the present invention disclose a method and system for providing location information of a mobile device to third parties in a communication network through a protocol that is device and network carrier independent. Position information of any first format is sent to a proxy server in a location information packet. An identifier that identifies the type and format of the position information is also sent.

The proxy server then takes the location information packet and based on its identifier, calls a proxy software driver, such as an executable plug-in module. The proxy driver is able to convert the position information of the first format into at least one of a plurality of published standard location formats.

Additionally, the executable plug-in module is able to recognize which of the plurality of standard location formats most closely matches or exactly matches the format required by the content provider. After the position information is converted to the format required by the content provider, the proxy server sends the position information to the content provider.

In one embodiment of the present invention, location information of a first format is sent from a mobile device to a proxy server. Position information of a first format is created indicating the geographic location of the mobile device. The position information is created by a software driver located in the mobile device. The software driver may be a network connection driver that connects the mobile device to a network carrier. In that case, position information associated with the network carrier, such as tower identification number, is relayed back to the software driver. The software driver may be directed to an internal global positioning satellite (GPS) hardware device located on the mobile device. The software driver may determine location by asking the user for position information.

The position information of the first format is then sent to a proxy server. An identifier that indicates the type and format of the position information is also sent. The proxy server accesses a first executable plug-in module or program that is directly associated with the identifier. The executable plug-in module is able to convert the position information of the first format into a plurality of standard location formats. In one embodiment, the plug-in module is a dynamic link library (DLL).

The plug-in module is able to determine the required format as required by a content provider. The required format is one of the plurality of standard location formats in one embodiment of the present invention. The plug-in module is able then to convert the position information of the first format into the format required by the content provider. After the conversion, the proxy server sends the position information of the required format to the content provider.

In another embodiment, the standard position information may be of any type providing geographic location and may consist of one of the following: network carrier tower identification; network carrier cell ID; zip code and postal code; global positioning satellite (GPS) coordinates; city name or code; country name or code; state name or code; county name or code; closest major airport name or code; phone area code; train station name or code; time zone; daylight saving time; mobile network ID; mobile network name; mobile network cellular ID; IP address; local time; street name; street address; and user ID.

In one embodiment of the present invention, a mobile device sends a query that is attached to a web clipping application located on the mobile device. The query is directed to a third party, such as a content provider, over a communication network via a proxy server. A location information packet is also sent to the proxy server along with the query. The location information packet also contains the position information of the mobile device, and an identifier that indicates the particular type and format the position information is comprised of.

In another embodiment of the present invention, a third party on the communication network initiates a request for location information pertaining to a mobile electronic device.

In another embodiment of the present invention, a mobile device sends a plurality of position information packets, each of which is identified with an identifier, each of which is associated with a software driver located on the mobile device. The proxy server directs each of the plurality of position information packets to the corresponding executable plug-in module as per the associated identifier. Each plug-in module converts the position information into the standard location format that most closely matches the format required by a requesting third party or content provider. Each plug-in module also gives a satisfaction number that indicates how closely the converted location information matches the required format. For example, if the conversion was exact, the satisfaction number may be one hundred percent.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 7 is a block diagram illustrating an exemplary raw position information packet that is generated by a software driver located on a handheld electronic device, in accordance with one embodiment of the present invention.

FIG. 9 is a table illustrating possible forms of standard position information formats, in accordance with one embodiment of the present invention.

DETAILED DESCRIPTION OF THE INVENTION

Figure 1A:
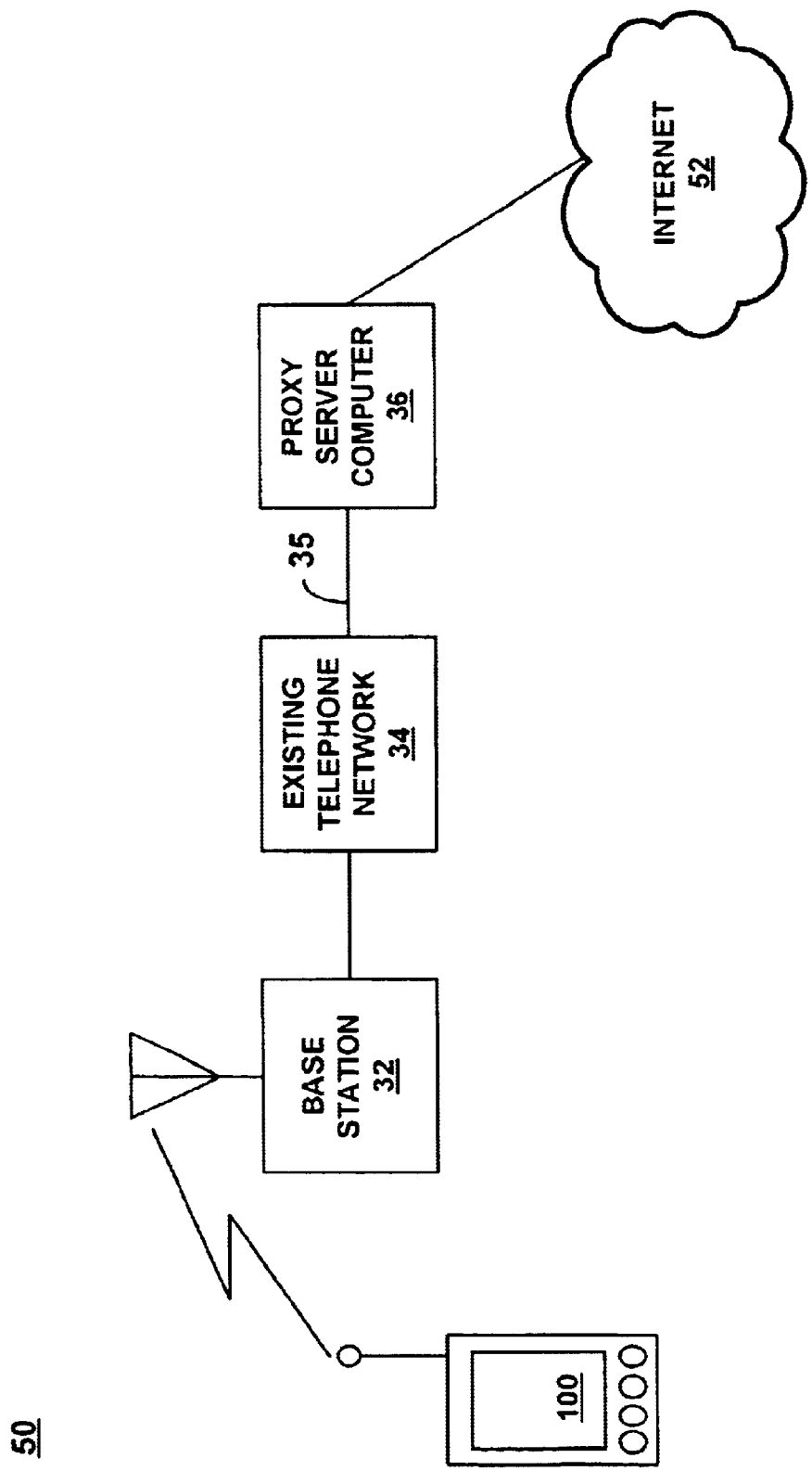
FIG. 1A illustrates a block diagram of a first exemplary network environment including a personal digital assistant in accordance with an embodiment of the present invention.

Reference will now be made in detail to the preferred embodiments of the present invention, a method and apparatus for a device and carrier independent location system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any mobile electronic device. One of the common types of electronic systems which can be used in accordance with one embodiment of the present invention is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange information, in order to synchronize the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

FIG. 1A is a block diagram of an exemplary network environment 50 including an exemplary personal digital assistant. The PDA 100 is also known as a palmtop or palm-sized electronic system or computer system. The PDA 100 has the ability to transmit and receive data and information over a wireless communication interface (e.g., a radio interface). The PDA 100 is one exemplary implementation on which the present invention can operate. The present invention can operate on any portable electronic system or device. The present invention can also operate on a non-portable system. For example, in one embodiment of the present invention, the local area network could be used to query location information.

In one embodiment, base station 32 is both a transmitter and receiver base station which can be implemented by coupling it into an existing public communication network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and-information between the PDA 100 and base station 32. It should be appreciated that one embodiment of a wireless communication system in accordance with the present invention is the Mobitex wireless communication system.

Figure 1B:
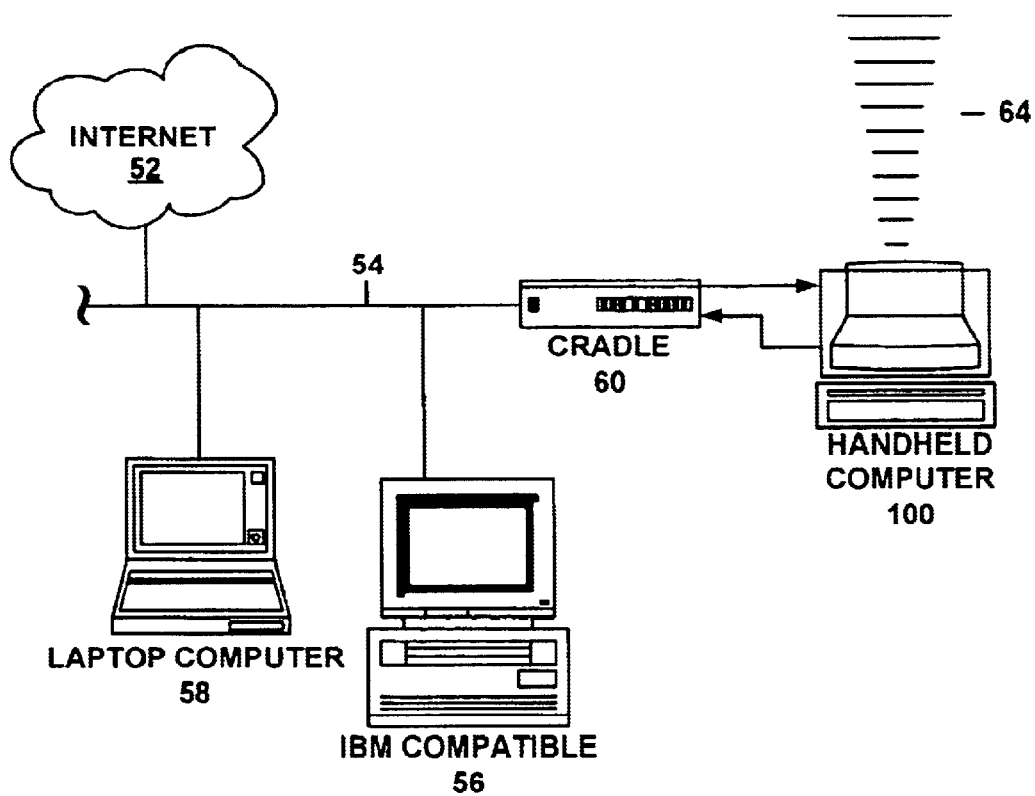
FIG. 1B illustrates a block diagram of a second exemplary network environment including a personal digital assistant coupled to other computer systems and the Internet via a cradle device in accordance with an embodiment of the present invention.

FIG. 1B illustrates a system 51 that can be used in conjunction with the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant 100 in one embodiment of the present invention. Cradle 60 provides an electrical and mechanical communication interface between bus 54 (and anything coupled to bus 54) and the computer system 100 for two way communications. Computer system 100 also contains a wireless infrared communication mechanism 64 (e.g., an infrared emitter and detector device) for sending and receiving information from other similarly equipped devices (see FIG. 1B).

With reference to FIGS. 1A and 1B, it is appreciated that the exemplary personal digital assistant or palmtop computer system 100 can be used in network environment combining elements of networks 50 and 51. That is, as will be seen below, the PDA 100 can include both a wireless infrared communication mechanism and a signal (e.g., radio) receiver/transmitter device.

Figure 2A:
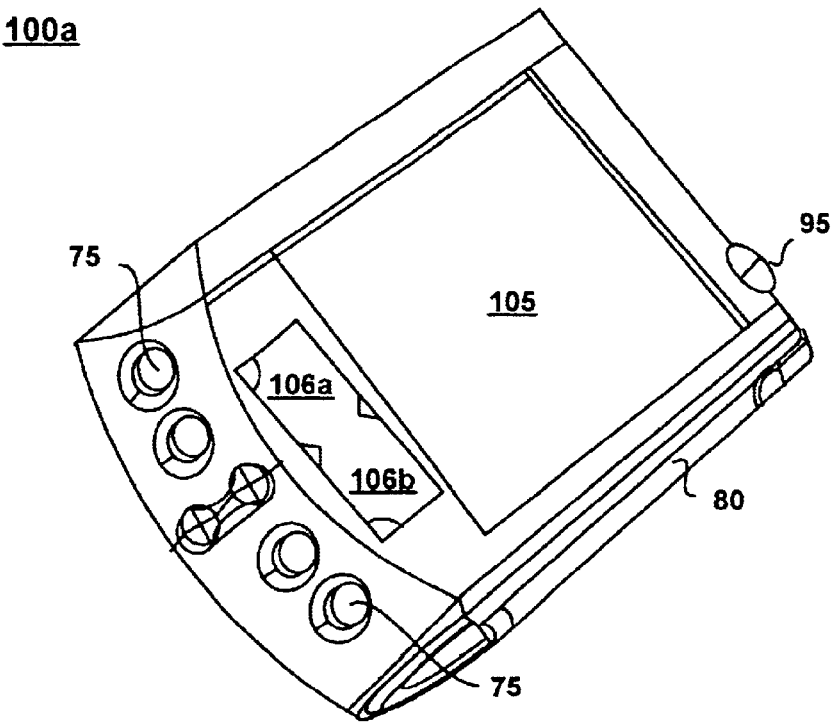
FIG. 2A is a top side perspective view of a palmtop computer system that can be used as a platform for the data entry and authentication embodiments of the present invention.

FIG. 2A is a perspective illustration of the top face 100a of one embodiment of the palmtop computer system. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b. The stroke information is then fed to an internal processor for automatic character recognition. Once characters are recognized, they are typically displayed on the screen for verification and/or modification.

Figure 2B:
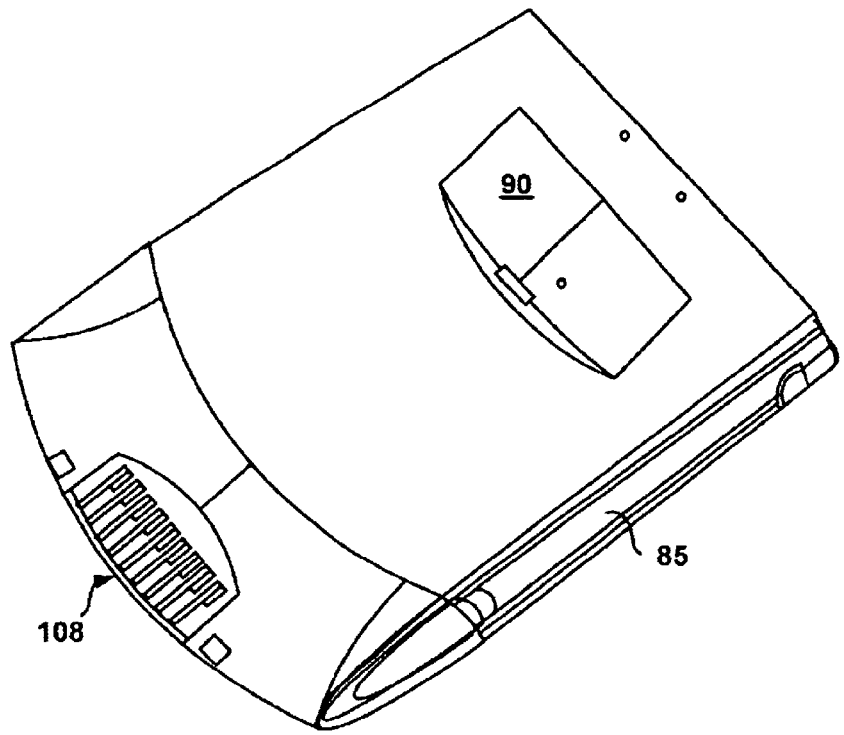
FIG. 2B is a bottom side perspective view of the palmtop computer system of FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 3:
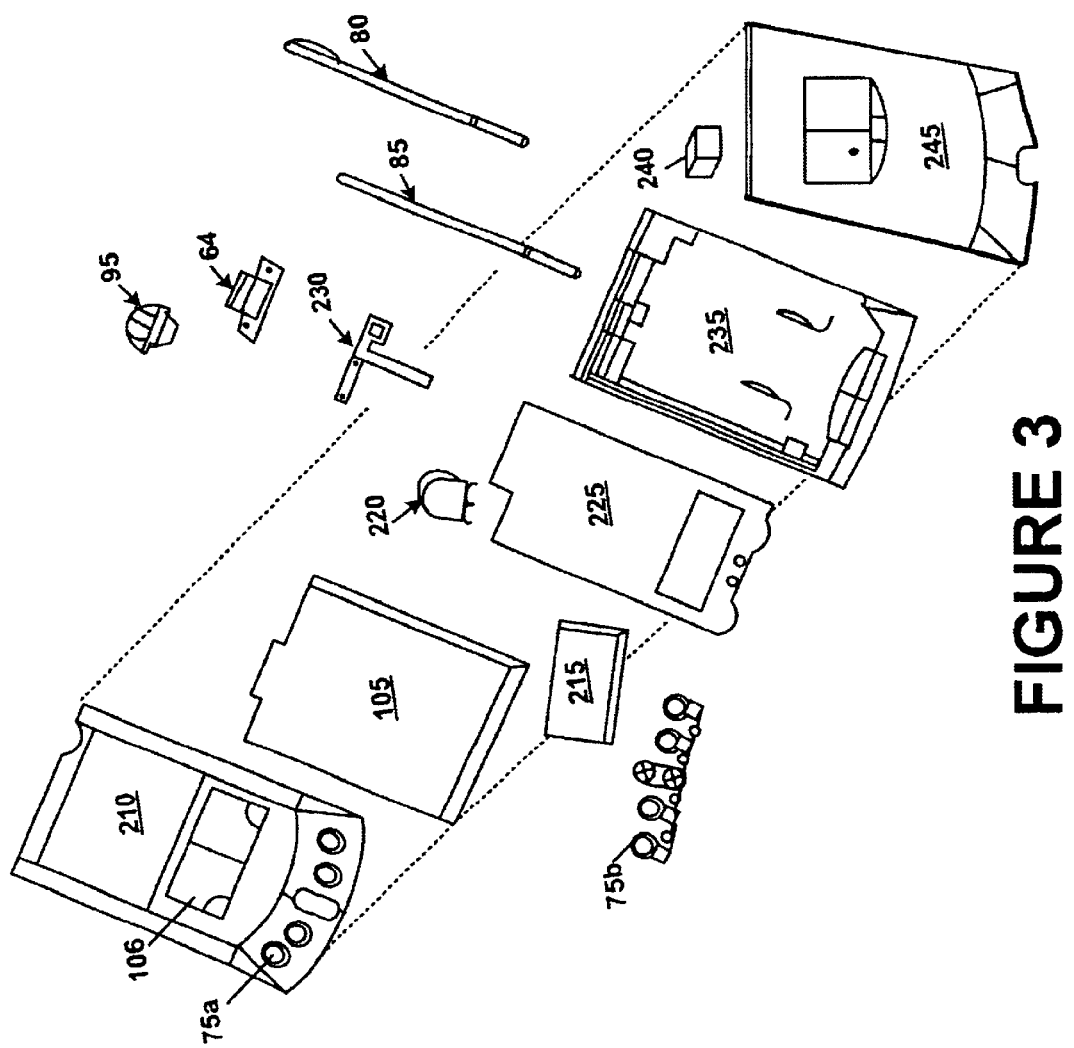
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. A digitizer pad can be part of the display assembly or it can also be included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
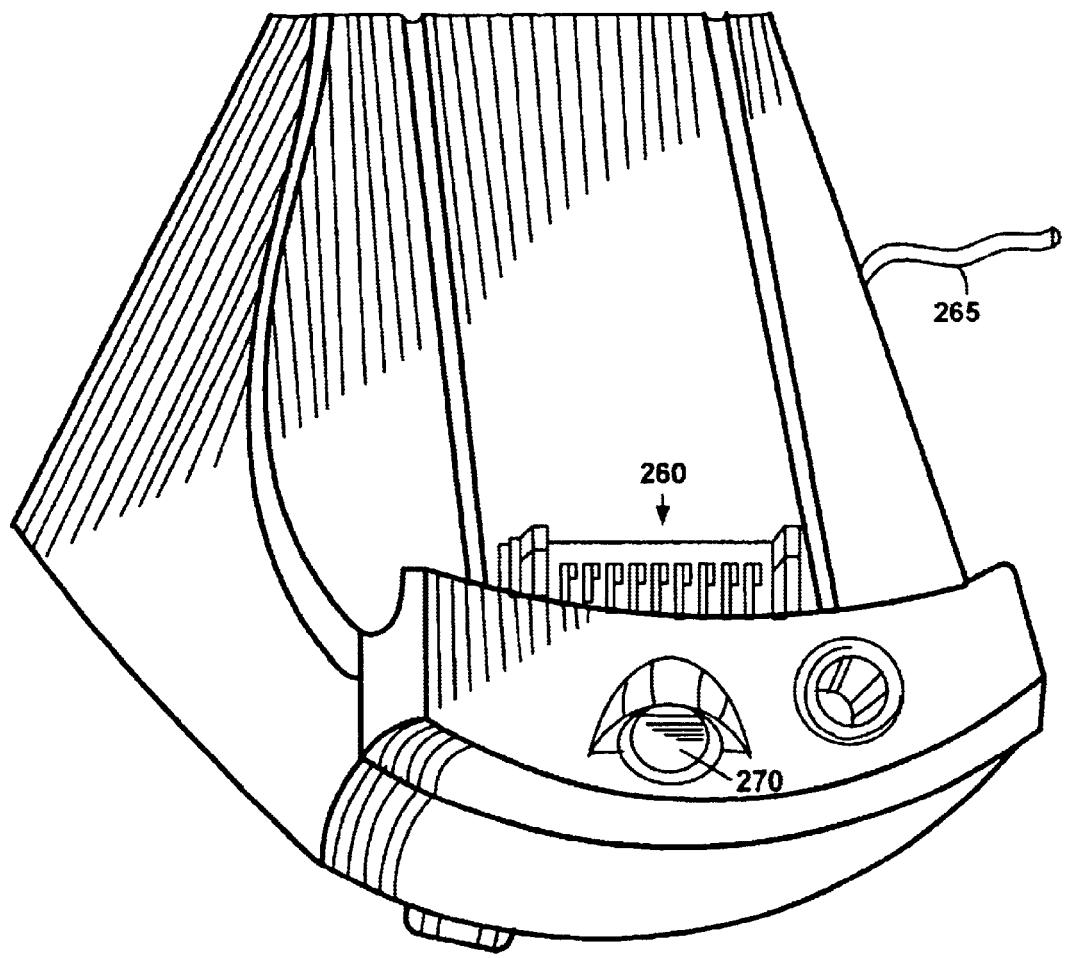
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with communication interface 108 (FIG. 2B) of computer system 100 when system 100 is slid into the cradle 60 in an upright position. Once inserted, button 270 can be pressed to initiate two way communication between system 100 and other computer systems coupled to electrical interface cable 265.

Figure 5:
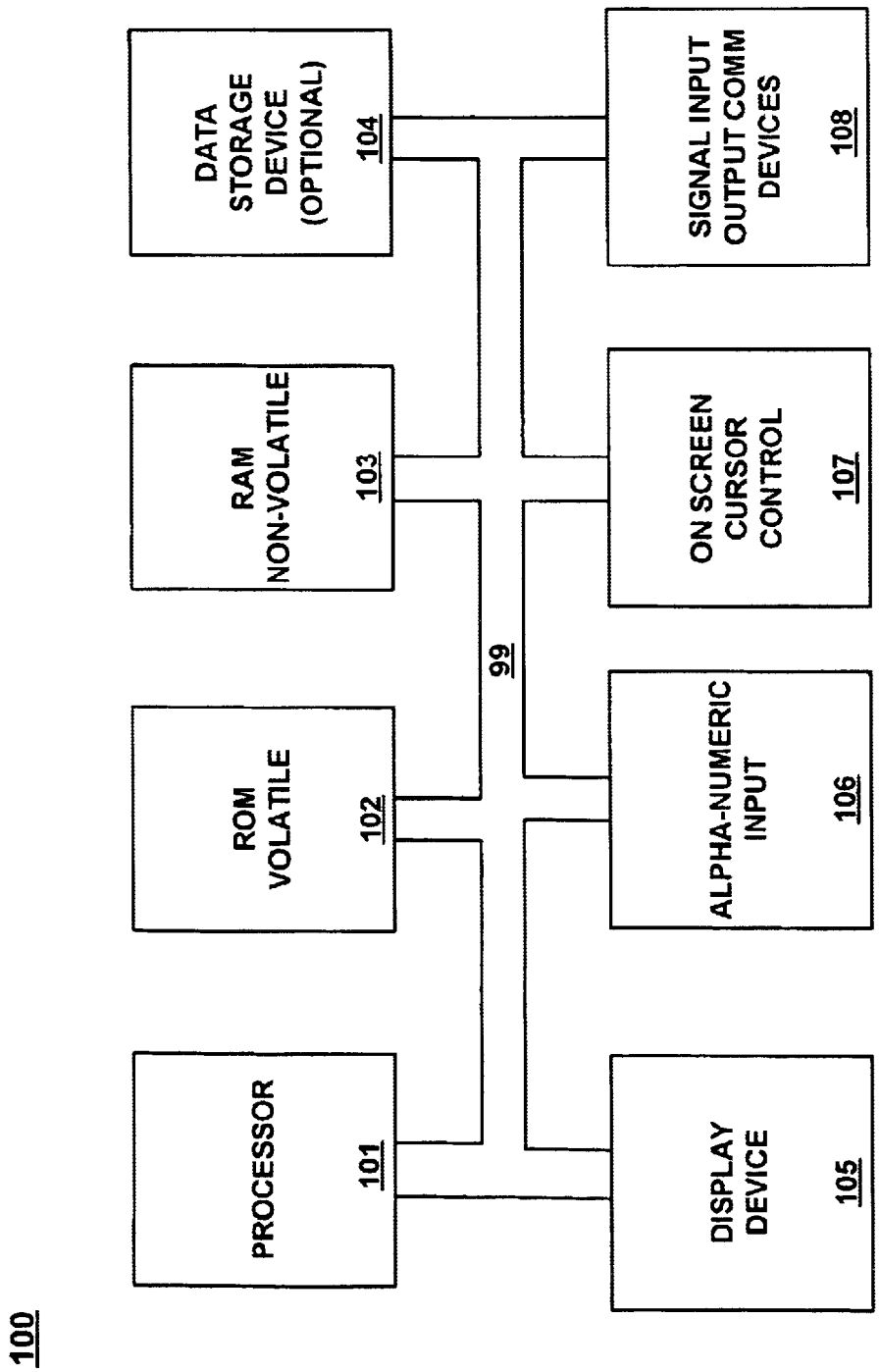
FIG. 5 is a logical block diagram of the palmtop computer system in accordance with an embodiment of the present invention.

Referring now to FIG. 5, portions of the present electronic system are comprised of computer-readable and computer-executable instructions which reside, for example, in computer-readable media of an electronic system (e.g., personal digital assistant, computer system, and the like). FIG. 5 is a block diagram of exemplary interior components of an exemplary personal digital assistant 100 upon which embodiments of the present invention may be implemented. It is appreciated that the exemplary PDA 100 of FIG. 5 is only exemplary and that the present invention can operate within a number of different electronic systems including general purpose networked computer systems, embedded computer systems, and stand alone electronic systems such as a cellular telephone or a pager.

FIG. 5 illustrates circuitry of an exemplary electronic system or computer system 100 (such as the personal digital assistant), some of which can be implemented on PC board 225 (FIG. 3). Exemplary computer system 100 includes an address/data bus 99 for communicating information, a central processor 101 coupled with the bus 99 for processing information and instructions, a volatile memory 102 (e.g., random access memory (RAM), static RAM dynamic RAM, etc.) coupled with the bus 99 for storing information and instructions for the central processor 101 and a non-volatile memory 103 (e.g., read only memory (ROM), programmable ROM, flash memory, EPROM, EEPROM, etc.) coupled to the bus 99 for storing static information and instructions for the processor 101. Exemplary computer system 100 also includes an optional data storage device 104 (e.g., memory card, hard drive, etc.) coupled with the bus 99 for storing information and instructions. Data storage device 104 can be removable. As described above, exemplary computer system 100 also contains an electronic display device 105 coupled to the bus 99 for displaying information to the computer user. In one embodiment, PC board 225 (FIG. 3) can contain the processor 101, the bus 99, the ROM 103 and the RAM 102.

Also included in computer system 100 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 100 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

With reference still to FIG. 5, exemplary computer system 100 also includes a signal input/output device 108 which is coupled to bus 99 for providing a communication link between computer system 100 and a network environment (e.g., network environment 50 and 51 of FIGS. 1A and 1B respectively). As such signal input/output device 108 enables central processor unit 101 to communicate wirelessly with other electronic systems coupled to the network. It should be appreciated that within the present embodiment, signal input/output device 108 is coupled to antenna 85 and provides the functionality to transmit and receive information over a wireless communication interface. It should be further appreciated that the present embodiment of signal input/output device 108 is well-suited to be implemented in a wide variety of ways. For example, signal input/output device 108 could be implemented as a modem. Further, signal input/output communication device 108, also coupled to bus 99, can be a serial port for communicating with the cradle 60. Additionally, device 108 can also include an infrared communication port.

Web Platform Applications

A method and system are described utilizing web platform applications and applications in general. Web platform applications resident on a personal digital assistant 100 are software programs that can run independently, or can be extensions of and supported by corresponding applications located on remote computer systems. Web platform applications are commonly known as web clipping applications, an example of which is a Palm Query Application (PQA), also known as web clipping application (WCA).

Web platform applications on PDA 100 can be extensions of corresponding applications located on a remote stand-alone computer system. For example, through synchronizing the PDA 100 with a stand-alone computer system, an address book application located on a PDA 100 can exchange data with and be supported by the corresponding applications located on a stand-alone computer system, such as system 56 in FIG. 1B. The process of synchronization is described in more detail in the following three U.S. patents which are hereby incorporated by reference: U.S. Pat. No. 5,727,202 entitled "Method and Apparatus for Synchronizing Information on Two Different Computer Systems", issued Mar. 10, 1998; U.S. Pat. No. 5,832,489 entitled Method and Apparatus for Synchronizing Information on Two Different Computer Systems", issued Nov. 3, 1998; U.S. Pat. No. 6,006,274 entitled "Method and Apparatus using a Pass Through Personal Computer Connected to Both a Local Communication Link and a Computer Network for Identifying and Synchronizing a Preferred Computer with a Portable Computer", issued Dec, 21, 1999.

Furthermore, web platform applications facilitate user interaction with content servers associated with those applications. The web platform application contains user-interface elements that retrieves, updates, and displays content on a PDA 100. A host of installed web applications on PDA 100 can provide access to specific types of information such as stock quotes, flight schedules, restaurant listing, as well as other pieces of information while connected to the Internet. Additionally, a web platform application can facilitate user interaction with a content server by having a user fill out query forms located on a web platform application while disconnected from the Internet. Subsequently, the forms are sent out for processing the next time the PDA 100 is synchronized with a host computer system, such as system 56 in FIG. 1B.

An example of a web platform application that is supported by a content server, that maintains a specific web site, could be a weather application. A user can use the weather web platform application to interact with the weather content server to access information about the latest weather conditions for the location of the user.

A user accesses information from a content server based on a simple query and response protocol. The query portion of the web platform application is stored locally on the PDA 100. The user enters data in to a request form (e.g., for a stock symbol, news topic, weather conditions, or name to look up) without even going on-line.

Providing Device and Carrier Independent Position Information of a Mobile Device Through a Communication Network Although the description of-the present invention will focus on an exemplary personal digital assistant (hereinafter referred to as "PDA") or palmtop:computer system, the present invention can be practiced with other electronic systems or electronic devices (e.g. personal computer systems, cellular phones, pagers, portable web devices, etc.).

Figure 6:
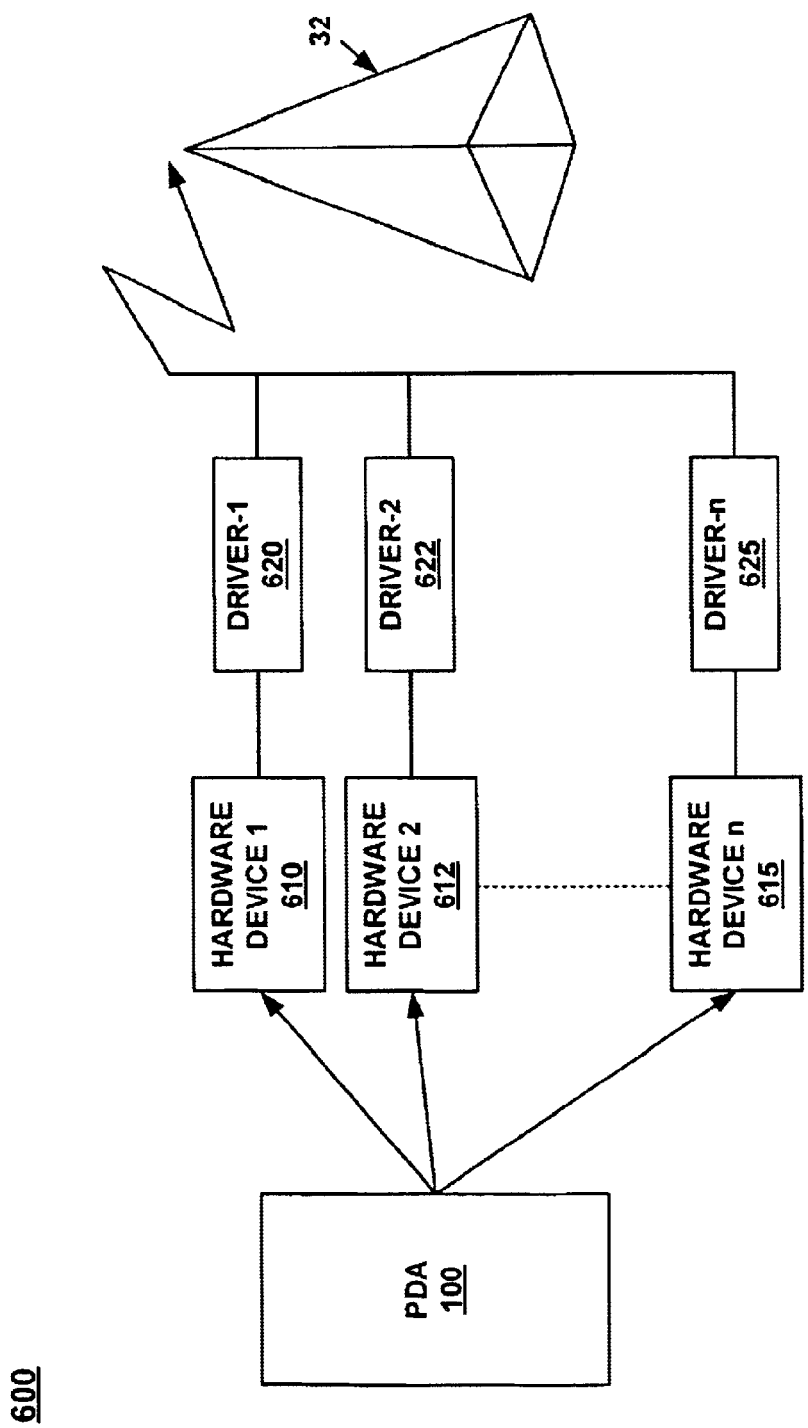
FIG. 6 illustrates a block diagram of a carrier access network for a handheld electronic device, in accordance with one embodiment of the present invention.

FIG. 6 illustrates a block diagram of the carrier access network 600 for a PDA 100, in one embodiment of the present invention. PDA 100 can access the network through a carrier through a number of connection hardware mechanisms. For example, the connection hardware could be an internal radio, wireless modem, wireline modem, a cradle attached to a host compute, etc. The PDA 100 could also have additional hardware devices like a Global Positioning Satellite (GPS) receiver. Each of these hardware access mechanisms or hardware devices can be represented as hardware device one in block 610, hardware device two in block 612, through the n hardware device in block 615.

Continuing with FIG. 6, there is a software driver for each access or connection hardware. There is also a software driver for each hardware device on the PDA 100. For example, for hardware device-one 610, there is an associated software driver-one 620. The other associated drivers are represented as driver-two 622, through the $n^{th}$ driver 625. The software driver of an access device coordinates the interaction between the PDA 100 and a base station of a specific carrier network, such as base station 32 of FIG. 1A, in order to access a communication network, such as the Internet.

In one embodiment of the present invention, the software driver understands that position information of the PDA 100 is required to send a query by the PDA 100. This query may be associated with a web clipping application (WCA) located on PDA 100, such as a weather WCA. The software driver may need to communicate with the carrier network to obtain whatever position information is available. For example, the carrier network may provide zip code or identification information for the closest tower providing access to the communication network for the PDA 100.

In another embodiment of the present invention, the PDA 100 may have multiple hardware devices that are capable of producing position information. For example, the software driver associated with a GPS system on the PDA 100 is capable of providing very accurate position information.

It is appreciated that there are many different ways to determine the precise or approximate location of a mobile device on the globe. These methods include, among others, the use of a GPS locator, finding something specific to the wireless (or wireline) network, such as using the cell identification (ID), asking the user where the mobile device is located for street names or addresses, or even determining position information from the date, hour and angle of the sun. Other types of information include mobile network carrier tower identification, mobile network carrier cell ID, mobile network ID, Internet IP address, user ID, network frequency, etc. The present invention can utilize any of these mechanisms to determine position information of the PDA 100.

In one embodiment, determining the position information of the PDA 100 is device and carrier independent. In other words, regardless of what device, or hardware used to access a communication network, or which carrier network is used to access the communication network, the present invention allows for the possibility for the PDA 100 to access any type of position information in order to provide location information to a proxy server.

In one embodiment, the location information may have been requested by a third party on the communication network that desires location information of a PDA 100. In another embodiment, the location information may be required by a content provider in order to process a request for information by the PDA 100. For example, a query or request for weather information requires location information to be provided. The location information may be provided in the initial query, via a web clipping application, or by a request by the content server.

FIG. 7 is a block diagram illustrating the raw position information packet 700 that is generated by a software driver located on the PDA 100, in accordance with one embodiment of the present invention. The packet 700 is a packet of digital data that might come from different sources of information to determine where the location of the connection hardware associated with the PDA 100. The precision of this location information may vary depending on the following: a) the type and sophistication of the mobile device; b) the carrier network; and c) the capabilities of the connection hardware and the software driver associated with the hardware. Typical information may be information related to the base station that the PDA 100 uses to access the communication network.

Continuing with FIG. 7, packet 700 may contain a raw position information identifier 710. This identifier 710 will indicate what type or format of location information data 730 is included within the packet 700. For example, if the data 730 is actual GPS coordinates of the PDA 100, the identifier may be number 17.

Additionally, raw information packet 700 may contain multiple types of location information in another embodiment. The identifier 710 may also contain information about electronic device that is sending the raw positing information identifier 710, such as the phone or PDA type. Furthermore, packet 700 may contain a length portion 720 that indicates the length of data 730.

In accordance with another embodiment of the present invention, each of the parts of the packet 700 is comprised of an 8 bit byte. So, the identifier 710 would be a maximum of 8 bits. It is appreciated that this is exemplary only and that each of the parts may be larger than 8 bits to accommodate the various of methods in determining location information.

Furthermore, more than one raw position information packet 700 may be generated by the software drivers associated with the hardware devices for a PDA 100. The more location information that is presented for a specific PDA 100, the better the chance of getting precise location information.

Figure 8:
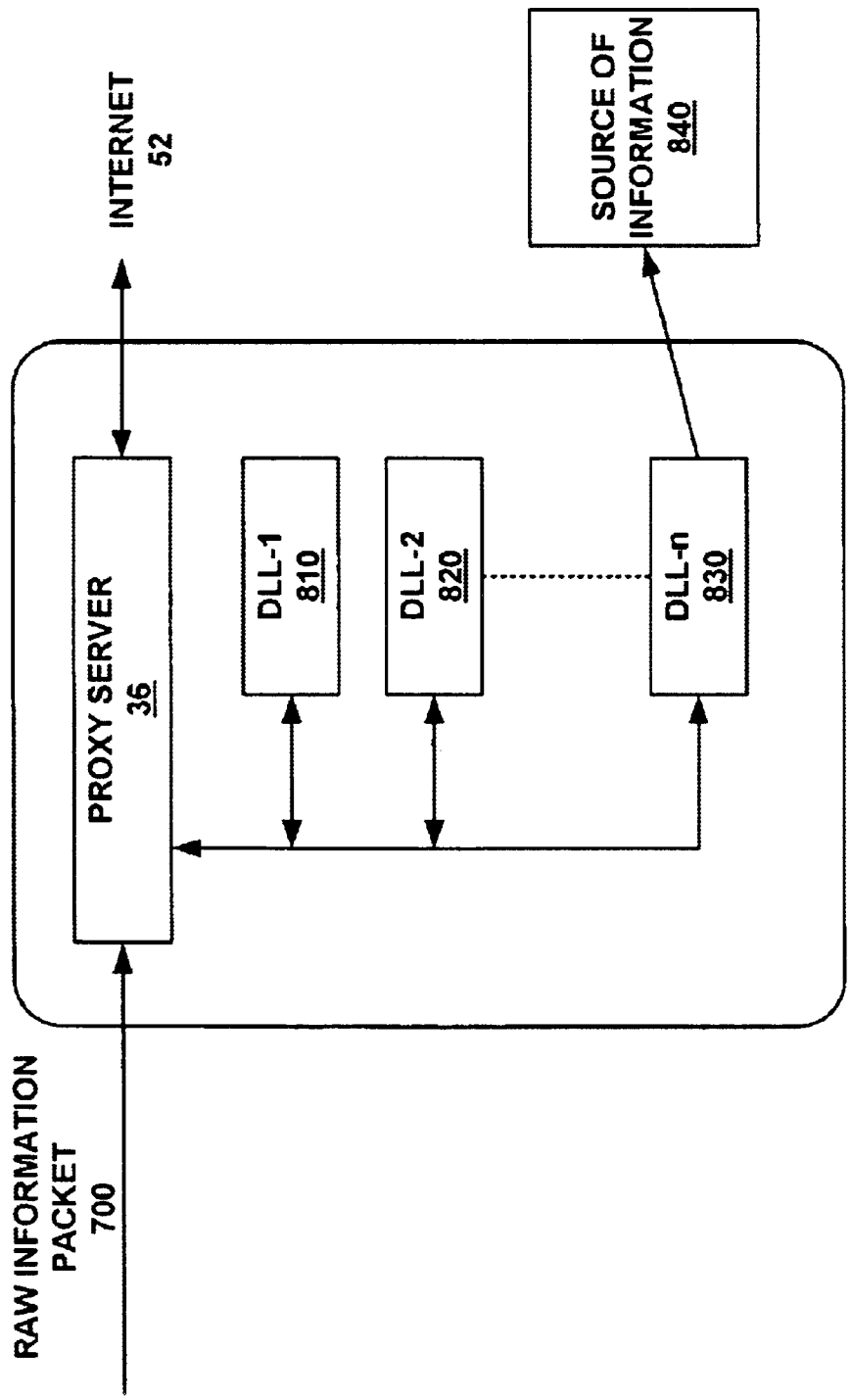
FIG. 8 illustrates a block diagram of the proxy server, in accordance with one embodiment of the present invention.

FIG. 8 illustrates a block diagram of the proxy server 36, in accordance with one embodiment of the present invention. The proxy server can be the proxy server 36 in FIG. 1A. FIG. 8 illustrates that a raw location packet 700 is sent to proxy server 36. In one embodiment of the present invention, the operating system of the PDA 100 takes the raw information packet 700 and sends the packet 700 to the proxy server. This location information might be more or less accurate with respect to the specific location information of the PDA 100. In any case, the raw location packet 700 will be identified using a raw location packet identifier 710.

The proxy server facilitates the interface of information between the PDA 100 and the content provider. For example, the proxy server 36 takes a query for weather information from the PDA 100 and sends it to the content provider over the Internet 52. Alternatively, the proxy server takes the resulting web page with weather information and sends it back to the PDA.

In one embodiment of the present invention, the proxy server 36 receives the raw information packet 700 from a PDA 100. The raw information packet 700 may be associated with a query from a web clipping application, or from a request from a third party request for location information regarding the PDA 100.

The proxy server 36 then locates the proper executable plug-in module associated with the raw information packet 700. The proper plug-in module is determined from the identifier associated with packet 700. In one embodiment of the present invention, each of the plug-in modules are dynamic link libraries (DLLs). For example, packet 700 may be associated with DLL-1 810 of FIG. 8. Each of the plugin module programs in FIG. 8 are able to convert the raw location information contained within an associated packet, such as packet 700, into at least one of a plurality of standard location formats.

In one embodiment of the present invention, these conversion programs are located within raw location dynamic link libraries (DLLs) contained within the proxy server. These DLLs are sometimes called proxy drivers. It is appreciated that the use of DLLs is exemplary only and that other technologies are equally useful, such as regular libraries, modules, etc.

Each of the raw location DLLs store executable routines as files that can be loaded and accessed when needed by a program, for example the conversion of the location information into a standard location information format. The programs contained within the raw location DLL can contain code that accesses tables contained within the raw location DLL, or even access information, tables, or programs contained within other web sites over a communication network, as shown by the source of information block 840 attached to raw location DLL-n 830.

Continuing with FIG. 8, proxy server 36 contains as many raw location DLLs as are necessary to convert the myriad of raw position information provided by the PDA 100 into standardized location formats. Proxy server 36 contains raw location DLL-1 810, raw location DLL-2 820, and on up to raw location DLL-n 830.

In accordance with embodiments of the present invention, this device and carrier independent system for providing location information allows for the addition of any new connection hardware or hardware device by supplying a corresponding software driver to the PDA 100 and a corresponding raw location DLL at the proxy server. The software driver knows how to interact with this new connection hardware or hardware device, such as a GPS receiver, in order to generate any possible raw location packet.

The proxy server will convert the raw location packet received from the PDA 100 using the appropriate raw location DLL, or proxy driver, in order to transform it into at least one of a plurality of standardized location information formats recognizable by the requesting party.

FIG. 9 is a Table 900 illustrating a plurality of standardized location information formats. Location information given in packet 700 is converted by a corresponding DLL into a standard location format as exemplified in Table 900.

For example, in processing a request for weather information over the Internet, the content provider may require only zip code information 912 to be converted from the raw location information packet 700. The raw information packet 700 may contain tower ID information. A corresponding executable plug-in module at the proxy server will take the tower ID information and convert that data into a zip code which corresponds to that tower. The zip code 912 typically corresponds to the tower or base station that the PDA 100 accesses the communication network. As such, the zip code may have an accuracy that can vary from a few hundred square feet to many hundreds of miles.

More specific location information may be required from content providers that need to know within a few meters the location of the PDA 100. For example, emergency health care services may require exact location information in the format of GPS coordinates 914.

It is appreciated that Table 900 is exemplary only and that other standard location formats not shown in Table 900 are possible such as closest major airport name or code, phone area code, time zone, daylight saving time, etc.

Figure 10:
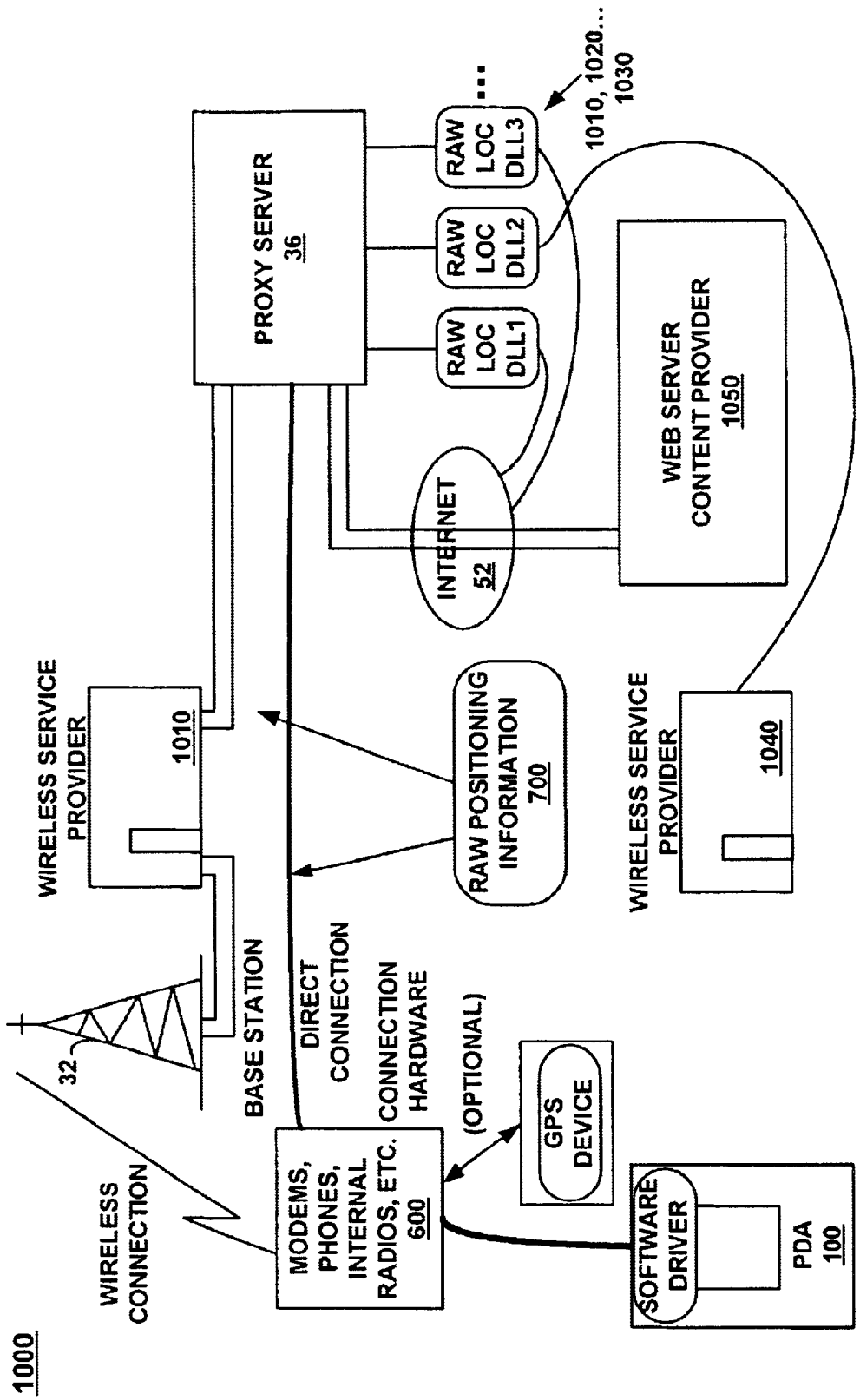
FIG. 10 is a block diagram of system that illustrates the process of providing location information over a communication network, in accordance with one embodiment of the present invention.

FIG. 10 is a block diagram of system 1000 that illustrates the process of providing location information over a communication network, in accordance with one embodiment of the present invention. System 1000 shows a PDA 100 that connects to a communication network using various connection hardware and software drivers 600. The PDA can use a wireless connection to a base station 32 or have a direst wireline connection to the proxy server 36. In the case of a wireless connection, a wireless service provider 1010 or carrier network 1010 is used to connect to the proxy server. In either case, raw positioning information 700 is sent to the proxy server 36 by the PDA 100.

At the proxy server 36, the raw position information of a first format is delivered to the corresponding DLL. The corresponding DLL is determined from an identifier sent along with the raw positioning information 70. The proxy server locates and accesses an appropriate DLL, 1010, 1020, or 1030 to convert the location information into at least one of a plurality of standardized location information formats. The content provider 1050 is able to interpret the position or location information in the standardized format. The DLLs can access other programs or databases in other content providers or wireless service providers, such as provider B 1040.

In accordance with another embodiment of the present invention, the DLL associated with the raw information packet 700 is able to convert the location information of the first format into a plurality of standard location information formats. Also, the DLL can determine which standard location information format is closest to the format required by a requesting third party, or the content provider that is the object of a web clipping application. Thus, the DLL knows the format the location information is included in the raw information packet 700 and the format required by the requesting party or content provider. The DLL then is able to convert the raw location information packet 700 into the format closest to the required format. In another embodiment, the DLL is able to convert the raw location information packet directly into the required format.

Figure 11:
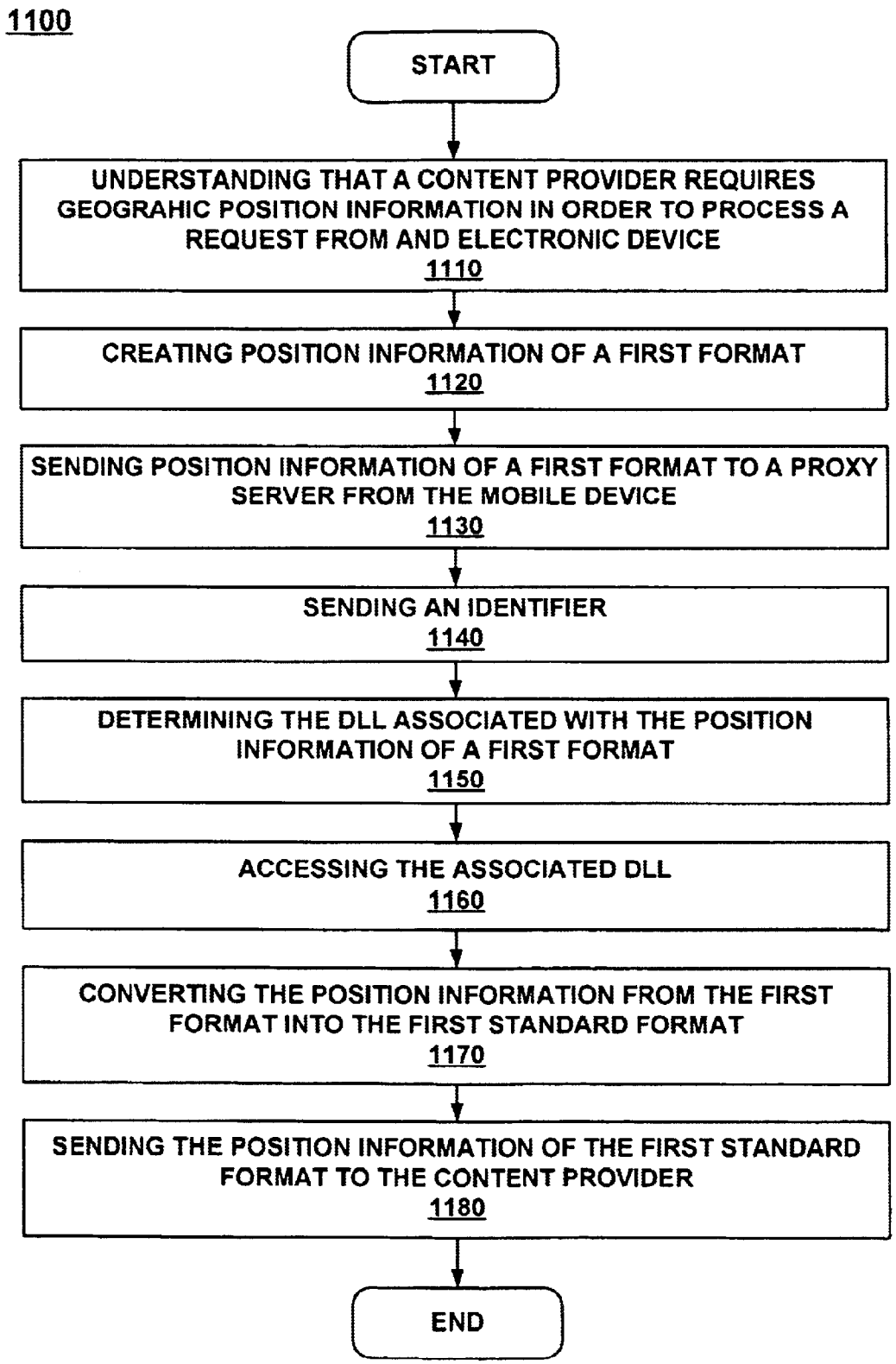
FIG. 11 illustrates a flow chart of steps in accordance with providing position and location information over a communication network, in one embodiment of the present invention.

FIG. 11 illustrates a flow chart of steps in accordance with providing position and location information over a communication network, such as the internet, in one embodiment of the present invention. Process 1100 begins with understanding that a content provider requires geographic position information in order to process a query or request for information from an electronic device, such as PDA 100, in step 1110.

In step 1120, position information of a first format is created by the PDA 100. The position information is created by software drivers located on the PDA 100. These software drivers may be network access drivers or may be associated with location hardware on the PDA 100, such as a GPS device.

In one embodiment, the position information is created by the software driver associated with the network connecting hardware. In that case, the software driver sends a request for the position information of said first format to the network carrier. The network carrier returns the information of a first format.

In another embodiment of the present invention, the software driver queries the-user for location information of the first format. For example, the user may provide zip code information, address information, etc. In particular, the user may provide location information that is not associated with the PDA 100. Such is the case when the user is traveling, but wants movie information for a location near the user's home.

In step 1130 of process 1100, the electronic device sends position information of the first format to a proxy server. This position information may be of any format that is particular to the carrier network, or hardware device, or connection hardware.

In step 1140 of process 1100, the PDA 100 sends an identifier with the position information. The identifier indicates the type and format of the position information. Specifically, the identifier tells the proxy server that the position information is of a first format.

In step 1150 of process 1100, the proxy server determines a first executable program that is associated with the position information of a first format. The associated executable program is determined from the identifier contained within the position information. In one embodiment, a plurality of executable programs is located within the proxy server, each of the executable programs associated with location information packets of specific formats.

In step 1160, the proxy server accesses the associated or first executable program in order to convert the position information from the first format into a first standard location format. This standard location format is recognizable by the requester of the location information.

In another embodiment of the present invention, the first executable program is capable of converting the position information of the first format into a plurality of standard location formats. The executable program is able to compare and recognize which of the standard location formats most closely matches the format as requested by a third party or a content provider.

Continuing with process 1100, in step 1170 the position information of the first format is converted into a first standard location format. In step 1180, the position information in the first standard location format is sent to the third party requesting the information. The third party may be a content provider.

In accordance with another embodiment, in the case where a third party is independently requesting location information, a specific request is made by the third party at a specific time for location information of a particular mobile device. For example, the third party may provide advertising for a local coffee shop. The third party has a request for location information pertaining to all mobile devices within a zip code area of the coffee shop. If any mobile device enters into a carrier network within the zip code, the third party is notified, whereby the third party can have a content provider send out an advertisement for that coffee shop.

In another embodiment of the present invention, a mobile device sends a plurality of position information packets, each of which is identified with an identifier, each of which is associated with a software driver located on the mobile device. The proxy server directs each of the plurality of position information packets to the corresponding executable plug-in module as per the associated identifier. Each plug-in module converts the position information into the standard location format that most closely matches the format required by a requesting third party or content provider. Each plug-in module also gives a satisfaction number that indicates how closely the converted location information matches the required format. For example, if the conversion was exact, the satisfaction number may be one hundred percent.

The proxy server then decides which one of the converted position information packets will be sent to the requesting party. In one embodiment, depending on the satisfaction value given by each of the DLLs, the proxy server will select the packet with the highest satisfaction value.

The flexibility of the process 1100, in accordance with embodiments of the present invention is without limit. Any mobile device located anywhere in the world can use any carrier network provider to talk to any server on the Internet in order to provide location information. Thus, embodiments of the present invention are device and carrier independent.

While the method of embodiments illustrated in process 1100 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions for the steps, and the data input and output from the steps of process 1100 may be implemented utilizing processor 101 and ROM memory 103 and RAM memory 102, as shown in FIG. 5. Furthermore, other types of memory storage can be utilized to accomplish the aforementioned such as a hard drive, a CD ROM, flash memory, or any compact integrated circuit memory storage device.

The preferred embodiment of the present invention, a device and carrier method and system for providing location information, is thus described. While the present invention has been described in particular embodiments, it should be appreciated that the present invention should not be construed as limited by such embodiments, but rather construed according to the below claims.

What is claimed is:

1. In a communication network, a method of providing location comprising the steps of:
   a) creating position information of a first format, said position information associated with a first electronic device;
   b) sending said position information of said first format from said first electronic device to a proxy server;
   c) sending an identifier with said position information, said identifier indicating said position information is of said first format;
   d) determining a first executable program of a plurality of executable programs, said first executable program associated with said identifier;
   e) accessing said first executable program, said first executable program able to convert said position information of said first format into a first standard location format of a plurality of standard location formats; and
   f) converting said position information into said first standard location formats.

2. The method as described in claim 1, comprising the further steps of:
   g) establishing communication between said proxy server and said second electronic device; and
   h) sending said position-information of said first standard location format to said second electronic device.

3. The method as described in claim 2, comprising the further steps of:
   h) determining a second format for said position information as required by a second electronic device, said second format comprising at least one of said plurality of standard location formats; and
   i) converting said position information of said first format into said second format.

4. The method as described in claim 1, wherein said second electronic device is a content provider.

5. The method as described in claim 1, wherein said first electronic device is a handheld electronic device.

6. The method as described in claim 5, wherein said executable plug-in module is a dynamic link library (DLL).

7. The method as described in claim 1, wherein each of said plurality of executable programs is an executable plug-in module.

8. The method as described in claim 1, wherein a connection software driver creates said position information of said first format in said step a), said step a) further comprising the steps of:
   sending a request for said position information of said first format from said connection software driver to a network carrier, said connection software driver connecting said first electronic device to said network carrier, said network carrier connecting said first electronic device to said communication network; and
   sending said position information of said first format from said network carrier to said first electronic device.

9. The method as described in claim 1, wherein a connection software driver creates said position information of said first format in said step a), said connection software driver connecting said first electronic device to said communication network, said step a) further comprising the steps of:
   asking a user of said first electronic device for said position information of said first format.

10. The method as described in claim 1, wherein said communication network is an Internet network.

11. The method as described in claim 1, wherein said method comprises the further step of:
    at said first electronic device, sending a query for information to said second electronic device via a web clipping application located on said first electronic device, said web clipping application associated with said second electronic device, said query containing said position information of said first format.

12. The method as described in claim 1, wherein said position information of said first format is taken from a group consisting essentially of:
    mobile network carrier tower identification;
    mobile network carrier cell ID;
    mobile network ID;
    global positioning satellite (GPS) coordinates;
    Internet IP address;
    street name;
    street address; and
    user ID;

sun angle; and network frequency.

13. The method as described in claim 1, wherein said position information of said second format is taken from a group consisting essentially of:

zip code and postal code;

global positioning satellite (GPS) coordinates;

city name or code;

country name or code;

state name or code;

county name or code;

closest major airport name or code;

phone area code;

train station name or code;

time zone;

daylight saving time;

mobile network ID;

mobile network name;

mobile network cellular ID;

IP address;

local time;

street name;

street address; and user ID.

14. In a communication network, a method of providing information comprising the steps of:

a) creating a first position information of a first format, said position information associated with a first electronic device;

b) creating a second position information of a second format, said position information associated with said first electronic device;

c) sending said first position information of said first format and said second position information of said second format to a proxy server;

d) accessing a first executable program from a plurality of executable programs, said first executable program able to convert said first position information of said first format into a first standard location format;

e) converting said first position information of said first format into said first standard location format;

f) accessing a second executable program from said plurality of executable programs, said second executable program able to convert said second position information of said second format into a second standard location format;

g) converting said second position information of said second format into said second standard location format;

h) determining a third position information of a third format as required by a second electronic device;

i) determining which of said first and second standard location formats most closely matches said third format; and j) sending said first or second standard location formats that most closely matches said third format to said second electronic device.

15. The method as described in claim 14, further comprising the steps of:

sending a first identifier with said first position information, said identifier indicating said first position information is of said first format;

sending a second identifier with said second position information, said identifier indicating said second position information is of said second format;

determining said first executable program of a plurality of executable programs, said first executable program associated with said first identifier;

determining said second executable program of said plurality of executable programs, said second executable program associated with said second identifier;

accessing said first executable program, said first executable program able to convert said position information of said first format into said first standard location format; and accessing said second executable program, said second executable program able to convert said position information of said second format into said second standard location format.

16. The method as described in claim 14, said method comprising the further steps of:

receiving a request at said proxy server from said second electronic device for location information pertaining to said first electronic device; and sending said request from said proxy server to said first electronic device.

17. The method as described in claim 14, wherein said second electronic device is a content provider.

18. The method as described in claim 14, wherein each of said plurality of executable programs is a dynamic link library (DLL).

19. The method as described in claim 14, wherein a first software driver creates said first position information of said first format in said step a), and a second software drier creates said second position information of said second format in said step b).

20. A computer system comprising a processor, a memory unit, and a display screen wherein said memory contains instructions that when executed implement a method of providing location comprising the steps of:

a) creating position information of a first format, said position information associated with a first electronic device;

b) sending said position information of said first format from said first electronic device to a proxy server;

c) sending an identifier with said position information, said identifier indicating said position information is of said first format;

d) determining a first executable program of a plurality of executable programs, said first executable program associated with said identifier;

e) accessing said first executable program, said first executable program able to convert said position information of said first format into a first standard location format of a plurality of standard location formats; and f) converting said position information into said first standard location formats.

21. The computer system as described in claim 20, comprising the further steps of:

g) establishing communication between said proxy server and said second electronic device; and h) sending said position information of said first standard location format to said second electronic device.

22. The computer system as described in claim 20, comprising the further steps of:

h) determining a second format for said position information as required by a second electronic device, said second format comprising at least one of said plurality of standard location formats; and i) converting said position information of said first format into said second format.

23. The computer system as described in claim 20, wherein said second electronic device is a content provider.

24. The computer system as described in claim 20, wherein said first electronic device is a handheld electronic device.

25. The computer system as described in claim 20, wherein each of said plurality of executable programs is an executable plug-in module.

26. The computer system as described in claim 25, wherein said executable plug-in module is a dynamic link library (DLL).

27. The computer system as described in claim 20, wherein a connection software driver creates said position information of said first format in said step a), said step a) further comprising the steps of:

sending a request for said position information of said first format from said connection software driver to a network carrier, said connection software driver connecting said first electronic device to said network carrier, said network carrier connecting said first electronic device to said communication network;

sending said position information of said first format from said network carrier to said first electronic device.

28. The computer system as described in claim 20, wherein a connection software driver creates said position information of said first format in said step a), said connection software driver connecting said first electronic device to said communication network, said step a) further comprising the steps of:

asking a user of said first electronic device for said position information of said first format.

29. The computer system as described in claim 20, wherein said communication network is an Internet network.

30. The computer system as described in claim 20, wherein said method comprises the further step of:

at said first electronic device, sending a query for information to said second electronic device via a web clipping application located on said first electronic device, said web clipping application associated with said second electronic device, said query containing said position information of said first format.

31. The computer system as described in claim 20, wherein said position information of said first format is taken from a group consisting essentially of:

mobile network carrier tower identification;

mobile network carrier cell ID;

mobile network ID;

global positioning satellite (GPS) coordinates;

Internet IP address;

street name;

street address; and user ID;

sun angle; and network frequency.

32. The computer system as described in claim 20, wherein said position information of said second format is taken from a group consisting essentially of:

zip code and postal code;

global positioning satellite (GPS) coordinates;

city name or code;

country name or code;

state name or code;

county name or code;

closest major airport name or code;

phone area code;

train station name or code;

time zone;

daylight saving time;

mobile network ID;

mobile network name;

mobile network cellular ID;

IP address;

local time;

street name;

street address; and user ID.

* * * * *